(12) United States Patent
Suciu et al.

(10) Patent No.: US 7,976,272 B2
(45) Date of Patent: Jul. 12, 2011

(54) INFLATABLE BLEED VALVE FOR A TURBINE ENGINE

(75) Inventors: Gabriel L. Suciu, Glastonbury, CT (US); Lawrence E. Portlock, Bethany, CT (US); Brian Merry, Andover, CT (US)

(73) Assignee: United Technologies Corporation, Hartford, CT (US)

( * ) Notice: Subject to any disclaimer, the term of this patent is extended or adjusted under 35 U.S.C. 154(b) by 1085 days.

(21) Appl. No.: 11/719,911

(22) PCT Filed: Dec. 1, 2004

(86) PCT No.: PCT/US2004/039989
§ 371 (c)(1),
(2), (4) Date: May 22, 2007

(87) PCT Pub. No.: WO2006/110122
PCT Pub. Date: Oct. 19, 2006

(65) Prior Publication Data
US 2009/0110544 A1    Apr. 30, 2009

(51) Int. Cl.
*F01D 25/12* (2006.01)
(52) U.S. Cl. .................. 415/126; 415/144; 60/39.43
(58) Field of Classification Search .............. 415/126, 415/127, 144, 145; 60/39.43
See application file for complete search history.

(56) References Cited

U.S. PATENT DOCUMENTS

| | | |
|---|---|---|
| 1,544,318 A | 6/1925 | Hodgkinson |
| 2,221,685 A | 11/1940 | Smith |
| 2,414,410 A | 1/1947 | Griffith |
| 2,499,831 A | 3/1950 | Palmatier |
| 2,548,975 A | 4/1951 | Hawthorne |
| 2,611,241 A | 9/1952 | Schulz |
| 2,620,554 A | 12/1952 | Mochel et al. |
| 2,698,711 A | 1/1955 | Newcomb |
| 2,801,789 A | 8/1957 | Moss |
| 2,830,754 A | 4/1958 | Stalker |
| 2,874,926 A | 2/1959 | Gaubatz |
| 2,989,848 A | 6/1961 | Paiement |
| 3,009,630 A | 11/1961 | Busquet |
| 3,037,742 A | 6/1962 | Dent et al. |
| 3,042,349 A | 7/1962 | Pirtle et al. |
| 3,081,597 A | 3/1963 | Kosin et al. |
| 3,132,842 A | 5/1964 | Tharp |
| 3,204,401 A | 9/1965 | Serriades |
| 3,216,455 A | 11/1965 | Cornell et al. |
| 3,267,667 A | 8/1966 | Erwin |
| 3,269,120 A | 8/1966 | Sabatiuk |
| 3,283,509 A | 11/1966 | Nitsch |
| 3,286,461 A | 11/1966 | Johnson |
| 3,302,397 A | 2/1967 | Davidovic |
| 3,363,419 A | 1/1968 | Wilde |

(Continued)

FOREIGN PATENT DOCUMENTS

DE             767704            5/1953

(Continued)

*Primary Examiner* — Edward Look
*Assistant Examiner* — Dwayne J White
(74) *Attorney, Agent, or Firm* — Carlson, Gaskey & Olds, P.C.

(57) ABSTRACT

A compressor for a turbine engine includes an inflatable bleed valve that selectively bleeds core airflow from the compressor. The bleed valve has an inlet leading from the compressor and a passageway leading from the inlet. An inflatable valve selectively obstructs the passageway based upon a controlled supply of high pressure air to the inflatable valve. The supply of high pressure air may be compressed core airflow from an area downstream of the inlet to the bleed valve.

27 Claims, 3 Drawing Sheets

U.S. PATENT DOCUMENTS

| | | |
|---|---|---|
| 3,404,831 A | 10/1968 | Campbell |
| 3,465,526 A | 9/1969 | Emerick |
| 3,496,725 A | 2/1970 | Ferri et al. |
| 3,505,819 A | 4/1970 | Wilde |
| 3,616,616 A | 11/1971 | Flatt |
| 3,684,857 A | 8/1972 | Morley et al. |
| 3,703,081 A | 11/1972 | Krebs et al. |
| 3,705,775 A | 12/1972 | Rioux |
| 3,720,060 A | 3/1973 | Davies et al. |
| 3,729,957 A | 5/1973 | Petrie et al. |
| 3,735,593 A | 5/1973 | Howell |
| 3,811,273 A | 5/1974 | Martin |
| 3,818,695 A | 6/1974 | Rylewski |
| 3,836,279 A | 9/1974 | Lee |
| 3,861,822 A | 1/1975 | Wanger |
| 3,932,813 A | 1/1976 | Gallant |
| 3,979,087 A | 9/1976 | Boris et al. |
| 4,005,575 A | 2/1977 | Scott et al. |
| 4,130,379 A | 12/1978 | Partington |
| 4,147,035 A | 4/1979 | Moore et al. |
| 4,251,185 A | 2/1981 | Karstensen |
| 4,251,987 A | 2/1981 | Adamson |
| 4,265,646 A | 5/1981 | Weinstein et al. |
| 4,271,674 A | 6/1981 | Marshall et al. |
| 4,298,090 A | 11/1981 | Chapman |
| 4,326,682 A | 4/1982 | Nightingale |
| 4,452,038 A | 6/1984 | Soligny |
| 4,463,553 A | 8/1984 | Boudigues |
| 4,561,257 A | 12/1985 | Kwan et al. |
| 4,563,875 A | 1/1986 | Howald |
| 4,631,092 A | 12/1986 | Ruckle et al. |
| 4,751,816 A | 6/1988 | Perry |
| 4,785,625 A | 11/1988 | Stryker et al. |
| 4,817,382 A | 4/1989 | Rudolph et al. |
| 4,834,614 A | 5/1989 | Davids et al. |
| 4,883,404 A | 11/1989 | Sherman |
| 4,887,424 A | 12/1989 | Geidel et al. |
| 4,904,160 A | 2/1990 | Partington |
| 4,912,927 A | 4/1990 | Billington |
| 4,965,994 A | 10/1990 | Ciokajlo et al. |
| 4,999,994 A | 3/1991 | Rud et al. |
| 5,010,729 A | 4/1991 | Adamson et al. |
| 5,012,640 A | 5/1991 | Mirville |
| 5,014,508 A | 5/1991 | Lifka |
| 5,088,742 A | 2/1992 | Catlow |
| 5,107,676 A | 4/1992 | Hadaway et al. |
| 5,157,915 A | 10/1992 | Bart |
| 5,182,906 A | 2/1993 | Gilchrist et al. |
| 5,224,339 A | 7/1993 | Hayes |
| 5,232,333 A | 8/1993 | Girault |
| 5,267,397 A | 12/1993 | Wilcox |
| 5,269,139 A | 12/1993 | Klees |
| 5,275,536 A | 1/1994 | Stephens et al. |
| 5,315,821 A | 5/1994 | Dunbar et al. |
| 5,328,324 A | 7/1994 | Dodd |
| 5,443,590 A | 8/1995 | Ciokajlo et al. |
| 5,466,198 A | 11/1995 | McKibbin et al. |
| 5,497,961 A | 3/1996 | Newton |
| 5,501,575 A | 3/1996 | Eldredge et al. |
| 5,537,814 A | 7/1996 | Nastuk et al. |
| 5,584,660 A | 12/1996 | Carter et al. |
| 5,628,621 A | 5/1997 | Toborg |
| 5,746,391 A | 5/1998 | Rodgers et al. |
| 5,769,317 A | 6/1998 | Sokhey et al. |
| 6,004,095 A | 12/1999 | Waitz et al. |
| 6,095,750 A | 8/2000 | Ross et al. |
| 6,102,361 A | 8/2000 | Riikonen |
| 6,158,207 A | 12/2000 | Polenick et al. |
| 6,223,616 B1 | 5/2001 | Sheridan |
| 6,244,539 B1 | 6/2001 | Lifson et al. |
| 6,364,805 B1 | 4/2002 | Stegherr |
| 6,381,948 B1 | 5/2002 | Klingels |
| 6,382,915 B1 | 5/2002 | Aschermann et al. |
| 6,384,494 B1 | 5/2002 | Avidano et al. |
| 6,430,917 B1 | 8/2002 | Platts |
| 6,454,535 B1 | 9/2002 | Goshorn et al. |
| 6,471,474 B1 | 10/2002 | Mielke et al. |
| RE37,900 E | 11/2002 | Partington |
| 6,513,334 B2 | 2/2003 | Varney |
| 6,619,030 B1 | 9/2003 | Seda et al. |
| 6,851,264 B2 | 2/2005 | Kirtley et al. |
| 6,883,303 B1 | 4/2005 | Seda |
| 6,899,513 B2 | 5/2005 | Eleftheriou |
| 6,910,854 B2 | 6/2005 | Joslin |
| 7,021,042 B2 | 4/2006 | Law |
| 7,214,157 B2 | 5/2007 | Flamang et al. |
| 2002/0190139 A1 | 12/2002 | Morrison |
| 2003/0031556 A1 | 2/2003 | Mulcaire et al. |
| 2003/0131602 A1 | 7/2003 | Ingistov |
| 2003/0131607 A1 | 7/2003 | Daggett |
| 2003/0192304 A1 | 10/2003 | Paul |
| 2004/0025490 A1 | 2/2004 | Paul |
| 2004/0070211 A1 | 4/2004 | Franchet et al. |
| 2004/0189108 A1 | 9/2004 | Dooley |
| 2004/0219024 A1 | 11/2004 | Soupizon et al. |
| 2005/0008476 A1 | 1/2005 | Eleftheriou |
| 2005/0127905 A1 | 6/2005 | Proctor et al. |

FOREIGN PATENT DOCUMENTS

| | | |
|---|---|---|
| DE | 765809 | 11/1954 |
| DE | 1173292 | 7/1964 |
| DE | 1301634 | 8/1969 |
| DE | 2361310 | 6/1975 |
| DE | 2451059 | 4/1976 |
| DE | 3333437 | 4/1985 |
| DE | 3942042 | 6/1991 |
| DE | 19519322 | 11/1996 |
| DE | 19646601 | 4/1997 |
| DE | 19644543 | 4/1998 |
| EP | 0475771 | 3/1992 |
| EP | 0661413 | 7/1995 |
| EP | 1319896 | 6/2003 |
| FR | 1033849 | 7/1953 |
| FR | 1367893 | 7/1964 |
| FR | 2274788 | 1/1976 |
| FR | 2566835 | 1/1986 |
| FR | 2599086 | 11/1987 |
| GB | 716263 | 9/1954 |
| GB | 766728 | 1/1957 |
| GB | 785721 | 11/1957 |
| GB | 905136 | 9/1962 |
| GB | 907323 | 10/1962 |
| GB | 958842 | 5/1964 |
| GB | 1026163 | 4/1966 |
| GB | 1046272 | 10/1966 |
| GB | 1287223 | 8/1972 |
| GB | 1338499 | 11/1973 |
| GB | 1351000 | 4/1974 |
| GB | 1357016 | 6/1974 |
| GB | 1466613 | 3/1977 |
| GB | 1503394 | 3/1978 |
| GB | 2016597 | 9/1979 |
| GB | 2026102 | 1/1980 |
| GB | 2095755 | 10/1982 |
| GB | 2191606 | 12/1987 |
| GB | 2229230 | 9/1990 |
| GB | 2265221 | 9/1993 |
| GB | 2401655 | 11/2004 |
| GB | 2410530 | 8/2005 |
| JP | 10184305 | 7/1998 |
| WO | 9902864 | 1/1999 |
| WO | 0127534 | 4/2001 |
| WO | 02081883 | 10/2002 |
| WO | 2004011788 | 2/2004 |
| WO | 2004022948 | 3/2004 |
| WO | 2004092567 | 10/2004 |
| WO | 2006/059968 | 6/2006 |
| WO | 2006/059969 | 6/2006 |
| WO | 2006/059972 | 6/2006 |
| WO | 2006/059973 | 6/2006 |
| WO | 2006/059974 | 6/2006 |
| WO | 2006/059975 | 6/2006 |
| WO | 2006/059976 | 6/2006 |
| WO | 2006/059977 | 6/2006 |
| WO | 2006/059978 | 6/2006 |
| WO | 2006/059979 | 6/2006 |
| WO | 2006/059980 | 6/2006 |

| | | | | | | |
|---|---|---|---|---|---|---|
| WO | 2006/059981 | 6/2006 | | WO | 2006/060006 | 6/2006 |
| WO | 2006/059982 | 6/2006 | | WO | 2006/060009 | 6/2006 |
| WO | 2006/059985 | 6/2006 | | WO | 2006/060010 | 6/2006 |
| WO | 2006/059986 | 6/2006 | | WO | 2006/060011 | 6/2006 |
| WO | 2006/059987 | 6/2006 | | WO | 2006/060012 | 6/2006 |
| WO | 2006/059988 | 6/2006 | | WO | 2006/060013 | 6/2006 |
| WO | 2006/059989 | 6/2006 | | WO | 2006/060014 | 6/2006 |
| WO | 2006/059990 | 6/2006 | | WO | 2006/062497 | 6/2006 |
| WO | 2006/059991 | 6/2006 | | WO | 2006059980 | 6/2006 |
| WO | 2006/059992 | 6/2006 | | WO | 2006059990 | 6/2006 |
| WO | 2006/059993 | 6/2006 | | WO | 2006060003 | 6/2006 |
| WO | 2006/059994 | 6/2006 | | WO | 2006/059971 | 8/2006 |
| WO | 2006/059995 | 6/2006 | | WO | 2006/059970 | 10/2006 |
| WO | 2006/059996 | 6/2006 | | WO | 2006/110122 | 10/2006 |
| WO | 2006/059999 | 6/2006 | | WO | 2006/059997 | 11/2006 |
| WO | 2006/060000 | 6/2006 | | WO | 2006/110124 | 11/2006 |
| WO | 2006/060001 | 6/2006 | | WO | 2006/110123 | 12/2006 |
| WO | 2006/060002 | 6/2006 | | WO | 2006/112807 | 12/2006 |
| WO | 2006/060004 | 6/2006 | | WO | 2006/110125 | 2/2007 |
| WO | 2006/060005 | 6/2006 | | WO | 2006/060003 | 3/2007 |

INFLATABLE BLEED VALVE FOR A TURBINE ENGINE

This invention was conceived in performance of U.S. Air Force contract F33657-03-C-2044. The government may have rights in this invention.

BACKGROUND OF THE INVENTION

The present invention relates to turbine engines, and more particularly to an inflatable bleed valve for a low pressure compressor for a turbine engine, such as a tip turbine engine.

An aircraft gas turbine engine of the conventional turbofan type generally includes a forward bypass fan, a low pressure compressor, a middle core engine, and an aft low pressure turbine, all located along a common longitudinal axis. A high pressure compressor and a high pressure turbine of the core engine are interconnected by a high pressure shaft. The high pressure compressor is rotatably driven to compress air entering the core engine to a relatively high pressure. This high pressure air is then mixed with fuel in a combustor, where it is ignited to form a high energy gas stream. The gas stream flows axially aft to rotatably drive the high pressure turbine, which rotatably drives the high pressure compressor via the high pressure shaft. The gas stream leaving the high pressure turbine is expanded through the low pressure turbine, which rotatably drives the bypass fan and low pressure compressor via a low pressure shaft.

Although highly efficient, conventional turbofan engines operate in an axial flow relationship. The axial flow relationship results in a relatively complicated elongated engine structure of considerable length relative to the engine diameter. This elongated shape may complicate or prevent packaging of the engine into particular applications.

A recent development in gas turbine engines is the tip turbine engine. Tip turbine engines may include a low pressure axial compressor directing core airflow into hollow fan blades. The hollow fan blades operate as a centrifugal compressor when rotating. Compressed core airflow from the hollow fan blades is mixed with fuel in an annular combustor, where it is ignited to form a high energy gas stream which drives the turbine that is integrated onto the tips of the hollow bypass fan blades for rotation therewith as generally disclosed in U.S. Patent Application Publication Nos.: 20030192303; 20030192304; and 20040025490. The tip turbine engine provides a thrust-to-weight ratio equivalent to or greater than conventional turbofan engines of the same class, but within a package of significantly shorter length.

The compressors for turbine engines are designed at the maximum power point. When operating at partial power points it sometimes becomes necessary to bleed air form the back of the compressor for stage matching reasons. At times, the rear compressor stages cannot handle the amount of flow that the front stages are pumping. To match flow, some air is bled off to reduce the flow entering the rear stages. Turbine engines may also use bleed air internally for accessory functions. Some bleed air may be discharged radially out through some of the turbine blades or stators for cooling purposes.

The compressor of a conventional turbine engine includes a bleed valve assembly including a rotating and translating ring with linkages. A large hydraulic actuator is disposed immediately proximate the bleed valve for selectively opening and closing the bleed valve. These bleed valve assemblies are large, heavy and complex. Moreover, these bleed valve assemblies are not easily packaged into the low pressure axial compressors for tip turbine engines. Conventional bleed valves like this are also radially inward of the bypass flow; however, the low compressor in conventional engines dips radially inward at the aft end of providing the room needed for the bleed valve. This is not true on the tip turbine engine.

SUMMARY OF THE INVENTION

In a turbine engine according to the present invention, a compressor for a turbine engine includes an inflatable bleed valve that selectively bleeds core airflow from the compressor. The bleed valve has an inlet leading from the compressor and a passageway leading from the inlet. An inflatable valve includes an expandable member that selectively obstructs the passageway based upon a controlled supply of high pressure air to the inflatable valve. The supply of high pressure air may be compressed core airflow from an area downstream of the inlet to the bleed valve.

In a tip turbine engine, the inflatable bleed valve may be located radially inwardly of the bypass airflow. The inflatable bleed valve is small enough to fit within the cavity defined by the splitter and the compressor case in a tip turbine engine. Although the inflatable bleed valve is particularly beneficial for a tip turbine engine, it could also be used in conventional turbine engines.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENTS

Figure 1:
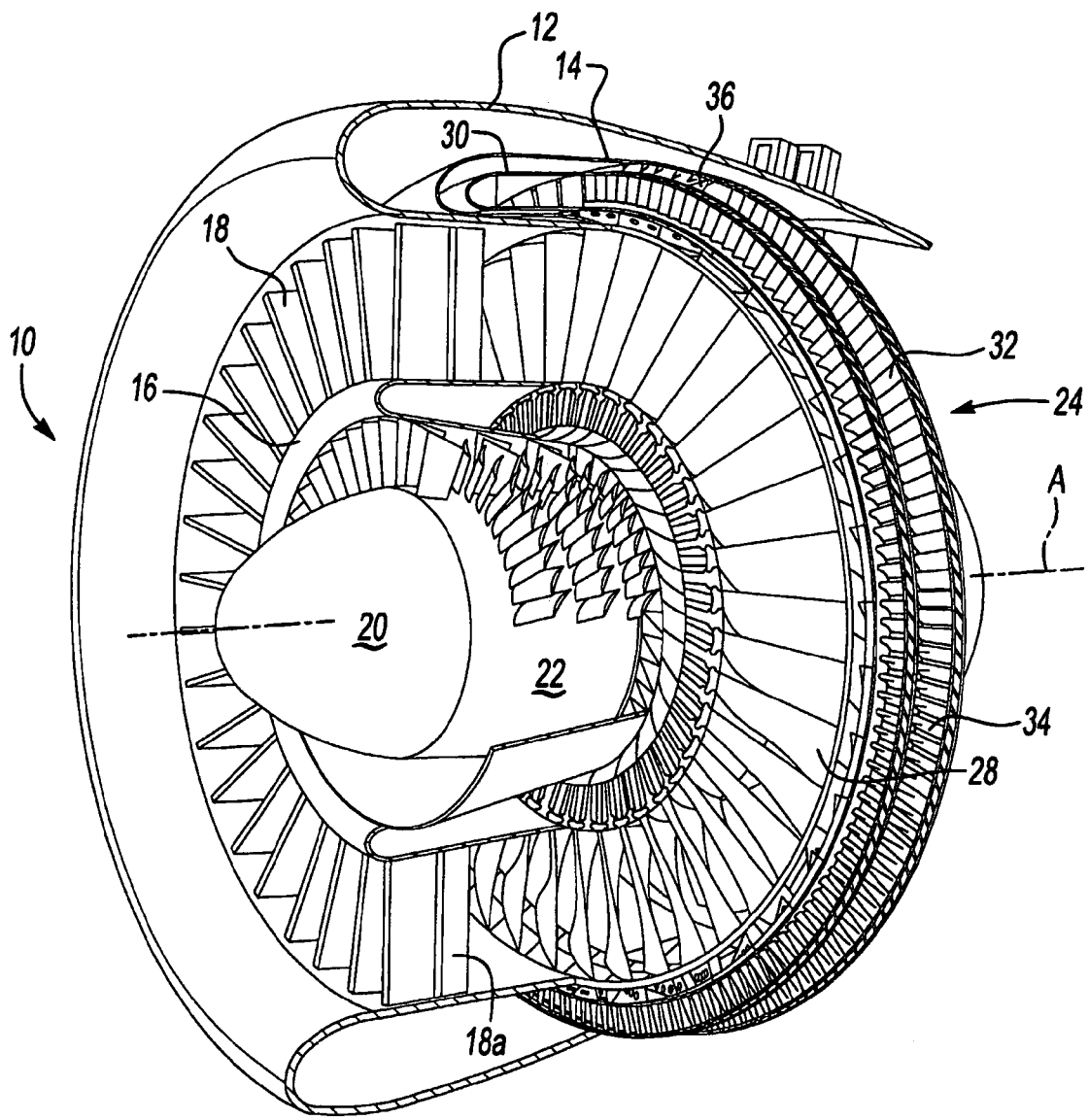
FIG. 1 is a partial sectional perspective view of a tip turbine engine.

FIG. 1 illustrates a general perspective partial sectional view of a tip turbine engine (TTE) type gas turbine engine 10. The engine 10 includes an outer nacelle 12, a rotationally fixed static outer support structure 14 and a rotationally fixed static inner support structure 16. A plurality of fan inlet guide vanes 18 are mounted between the static outer support structure 14 and the static inner support structure 16. Each inlet guide vane preferably includes a variable trailing edge 18A.

A nosecone 20 is preferably located along the engine centerline A to improve airflow into an axial compressor 22, which is mounted about the engine centerline A behind the nosecone 20.

A fan-turbine rotor assembly 24 is mounted for rotation about the engine centerline A aft of the axial compressor 22. The fan-turbine rotor assembly 24 includes a plurality of hollow fan blades 28 to provide internal, centrifugal compression of the compressed airflow from the axial compressor 22 for distribution to an annular combustor 30 located within the rotationally fixed static outer support structure 14.

A turbine 32 includes a plurality of tip turbine blades 34 (two stages shown) which rotatably drive the hollow fan blades 28 relative a plurality of tip turbine stators 36 which extend radially inwardly from the rotationally fixed static outer support structure 14. The annular combustor 30 is disposed axially forward of the turbine 32 and communicates with the turbine 32.

Figure 2:
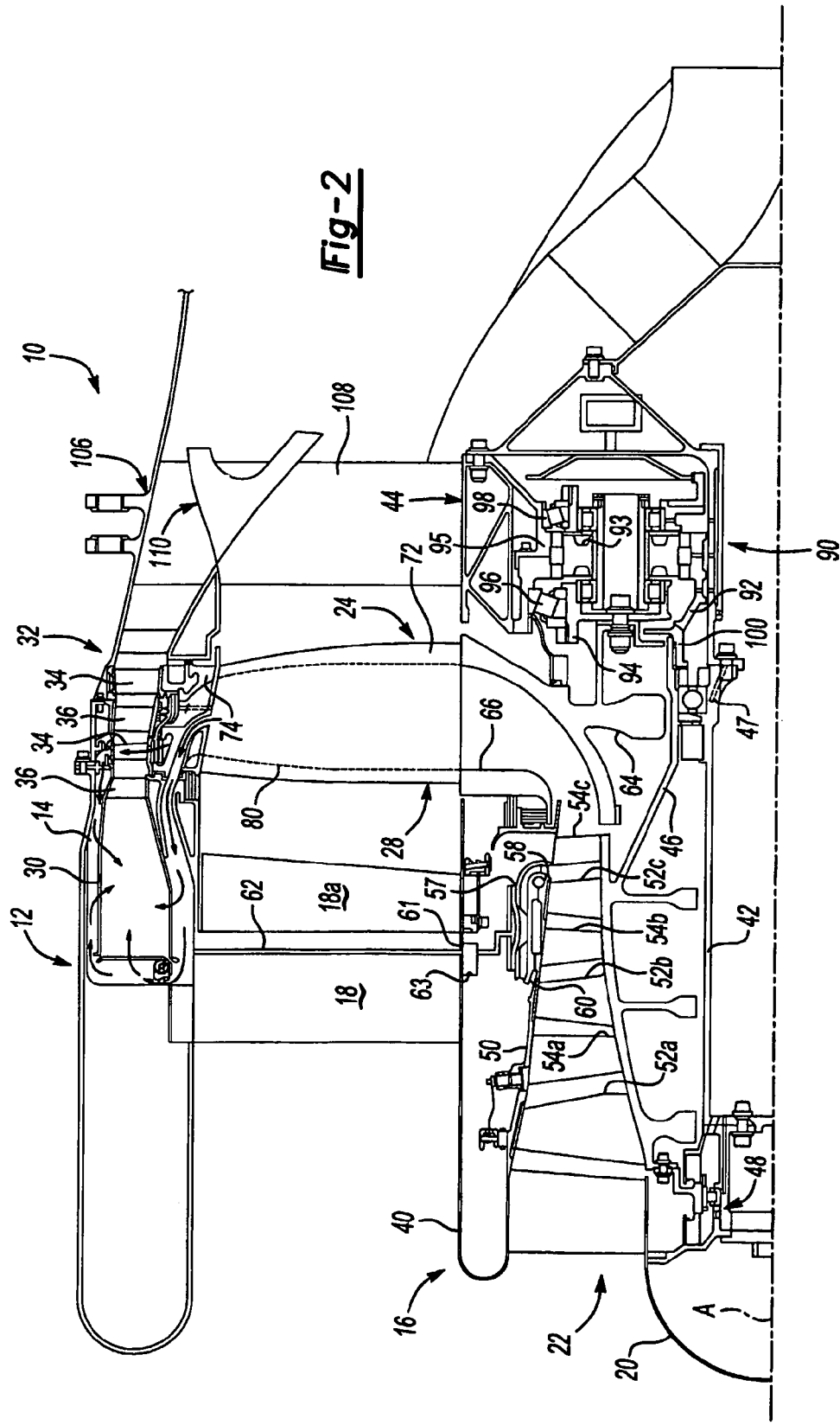
FIG. 2 is a longitudinal sectional view of the tip turbine engine of FIG. 1 along an engine centerline.

Referring to FIG. 2, the rotationally fixed static inner support structure 16 includes a splitter 40, a static inner support housing 42 and a static outer support housing 44 located coaxial to said engine centerline A.

The axial compressor 22 includes the axial compressor rotor 46, which is mounted for rotation upon the static inner support housing 42 through an aft bearing assembly 47 and a forward bearing assembly 48. A plurality of compressor blades 52a-c extend radially outwardly from the axial compressor rotor 46 within a fixed compressor case 50. A plurality of compressor vanes 54a-c extend radially inwardly from the compressor case 50 between stages of the compressor blades 52a-c. The compressor blades 52a-c and compressor vanes 54a-c are arranged circumferentially about the axial compressor rotor 46 in stages (three stages of compressor blades 52a-c and compressor vanes 54a-c are shown in this example).

A bleed valve 57 mounted between the compressor case 50 and the splitter 40 has an inlet 58 through the compressor case 50 between the last compressor vanes 54c and the last compressor blades 52c. The bleed valve 57 includes an outlet 60 between the compressor case 50 and the splitter 40. The bleed valve 57 selectively bleeds air out from the axial compressor 22 to control the amount of compressed core airflow into the hollow fan blades 28, depending upon the requirements of the tip turbine engine 10 at the time. A valve 61 obtains high pressure air from a conduit 62 leading from the combustor 30 and selectively supplies the high pressure air to the bleed valve 57 to controllably close the bleed valve 57 a selected amount. The valve 61 also selectively releases air from the bleed valve 57 through an outlet 63 into the cavity between the compressor case 50 and splitter 40 to selectively open the bleed valve 57 a selected amount. Air flowing through the bleed valve 57 from the axial compressor 22 is released in the cavity between the compressor case 50 and the splitter 40, where it may pass through the inlet guide vane 18 and discharge at an outer diameter of the nacelle 12. The valve 61 could be mounted in a variety of locations and connected via conduit to the bleed valve 57. For example, the valve 61 could be located in the nacelle 12 adjacent the combustor 30.

The fan-turbine rotor assembly 24 includes a fan hub 64 that supports a plurality of the hollow fan blades 28. Each fan blade 28 includes an inducer section 66, a hollow fan blade section 72 and a diffuser section 74. The inducer section 66 receives airflow from the axial compressor 22 generally parallel to the engine centerline A and turns the airflow from an axial airflow direction toward a radial airflow direction. The airflow is radially communicated through a core airflow passage 80 within the fan blade section 72 where the airflow is centrifugally compressed. From the core airflow passage 80, the airflow is diffused and turned once again by the diffuser section 74 toward an axial airflow direction toward the annular combustor 30. Preferably, the airflow is diffused axially forward in the engine 10, however, the airflow may alternatively be communicated in another direction.

The tip turbine engine 10 may optionally include a gearbox assembly 90 aft of the fan-turbine rotor assembly 24, such that the fan-turbine rotor assembly 24 rotatably drives the axial compressor 22 via the gearbox assembly 90. In the embodiment shown, the gearbox assembly 90 provides a speed increase at a 3.34-to-one ratio. The gearbox assembly 90 may be an epicyclic gearbox, such as a planetary gearbox as shown, that is mounted for rotation between the static inner support housing 42 and the static outer support housing 44.

The gearbox assembly 90 includes a sun gear 92, which rotates the axial compressor rotor 46, and a planet carrier 94, which rotates with the fan-turbine rotor assembly 24. A plurality of planet gears 93 each engage the sun gear 92 and a rotationally fixed ring gear 95. The planet gears 93 are mounted to the planet carrier 94. The gearbox assembly 90 is mounted for rotation between the sun gear 92 and the static outer support housing 44 through a gearbox forward bearing 96 and a gearbox rear bearing 98. The gearbox assembly 90 may alternatively, or additionally, reverse the direction of rotation and/or may provide a decrease in rotation speed.

A plurality of exit guide vanes 108 are located between the static outer support housing 44 and the rotationally fixed exhaust case 106 to guide the combined airflow out of the engine 10 and provide forward thrust. An exhaust mixer 110 mixes the airflow from the turbine blades 34 with the bypass airflow through the fan blades 28.

Figure 3:
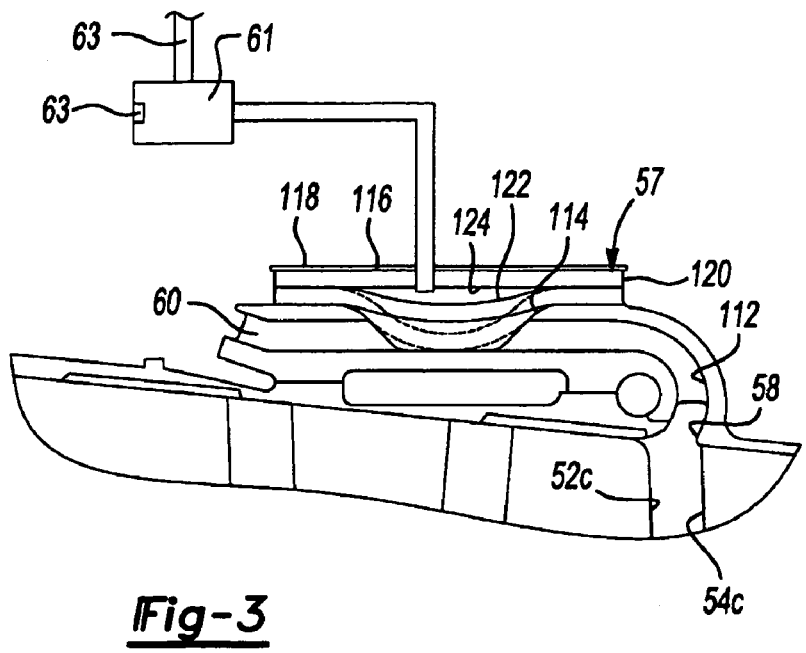
FIG. 3 is an enlarged view of the inflatable bleed valve of FIG. 2.

The bleed valve 57 is shown in more detail in FIG. 3. The bleed valve 57 includes a passageway 112 between the inlet 58 and the outlet 60. In this embodiment, the passageway 112 extends generally axially forward, such that the inlet 58 is located aft of the outlet 60, however, alternative orientations could be used. An opening 114 is formed on the outer diameter of the passageway 112 and an inflatable, annular valve 116 is mounted over the opening 114. The valve 116 includes a rigid outer annular ring 118 to which is mounted a seal 120. A flexible, expandable ring 122, radially inward of the seal 120, defines an inflatable interior 124 between the ring 122 and the seal 120. The valve 61 (FIG. 2) selectively supplies high pressure air to the interior 124, thereby selectively causing the ring 122 to expand through the opening 114 and obstruct the passageway 112 by a controlled amount. The ring 122 can selectively be expanded any amount between an uninflated, fully retracted position, as shown, and a fully expanded, filly inflated position where the passageway 112 is completely closed. Air flowing through the bleed valve 57 from the axial compressor 22 is released in the cavity between the compressor case 50 and the splitter 40 or may be used for accessory functions, thereby reducing the amount of core airflow into the inducer 66 and the hollow fan blades 28.

Figure 4:
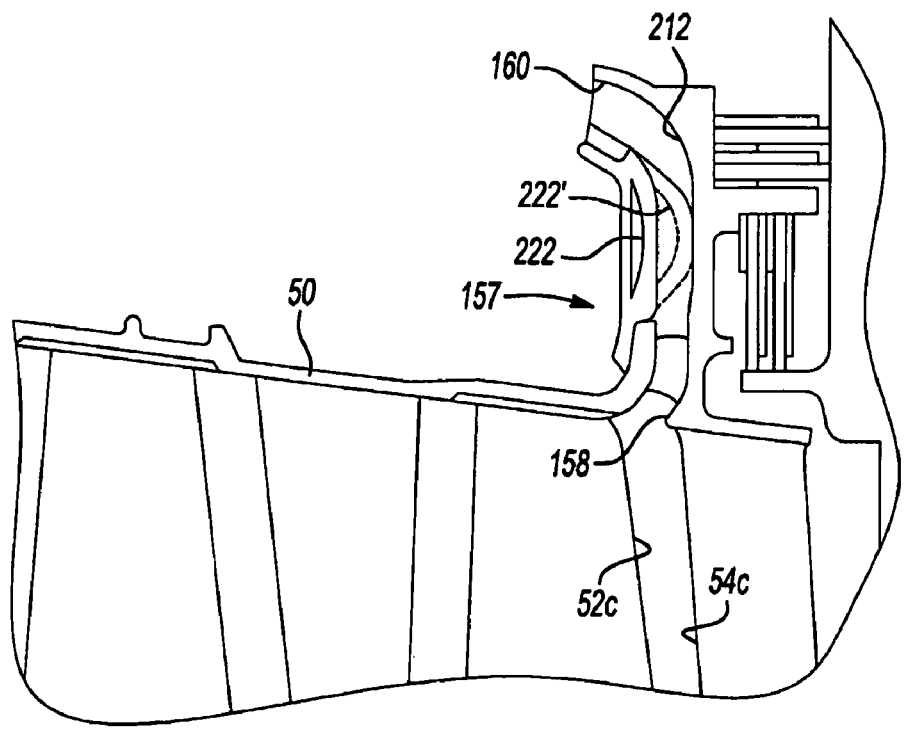
FIG. 4 is a view, similar to that of FIG. 3, of an alterative inflatable bleed valve.

FIG. 4 shows a bleed valve 157 according to a second embodiment of the present invention, which could also be used in the tip turbine engine 10 of FIGS. 1-2. In this embodiment, the passageway 212 of the bleed valve 157 extends radially outwardly, such that the outlet 160 is substantially radially aligned with the inlet 158. The flexible ring 222 is similarly selectively expandable to control the amount of core airflow bled from the axial compressor 22. In FIG. 4, the flexible ring 222 is shown in the uninflated, open position as reference numeral 222 and in the inflated, closed position as 222'. Again, it is noted that the flexible ring 222 is also selectively adjustable to any point between fully open and filly closed.

Referring to FIG. 2, in operation, core airflow enters the axial compressor 22, where it is compressed by the compressor blades 52a-c. To control the core airflow into the combustor 30, the bleed valve 57 (or, optionally bleed valve 157 from FIG. 4) is selectively opened or closed a selected amount. Bleed air is discharged through the inlet guide vane 18 and/or may be used for accessory functions. The compressed air from the axial compressor 22 that is not bled off enters the inducer section 66 in a direction generally parallel to the engine centerline A, and is then turned by the inducer section 66 radially outwardly through the core airflow passage 80 of the hollow fan blades 28. The airflow is further compressed centrifugally in the hollow fan blades 28 by rotation of the hollow fan blades 28. From the core airflow passage 80, the airflow is turned and diffused axially forward in the engine 10 by the diffuser section 74 into the annular combustor 30. The compressed core airflow from the hollow fan blades 28 is mixed with fuel in the annular combustor 30 and ignited to form a high-energy gas stream.

The high-energy gas stream is expanded over the plurality of tip turbine blades 34 mounted about the outer periphery of the fan-turbine rotor assembly 24 to drive the fan-turbine rotor assembly 24, which in turn rotatably drives the axial compressor 22 either directly or via the optional gearbox assembly 90. The fan-turbine rotor assembly 24 discharges fan bypass air axially aft to merge with the core airflow from the turbine 32 in the exhaust case 106.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

The invention claimed is:

1. A turbine engine comprising:
a fan having a plurality of fan blades, wherein at least one of the fan blades defines a compressor chamber extending radially therein; and
a compressor having a compressor case and a bleed valve having an inlet leading from the compressor case, the bleed valve further including a passageway leading from the inlet and an inflatable valve selectively obstructing the passageway, the compressor compressing core airflow, wherein at least some of the core airflow from the compressor that does not enter the inlet of the bleed valve is sent to the compressor chamber in the at least one fan blade for further compression.

2. The turbine engine of claim 1 wherein the inflatable valve selectively obstructs the passageway in a continuously variable manner between a fully open position and a fully closed position.

3. The turbine engine of claim 1 wherein the inflatable valve increases its obstruction of the passageway as its inflation is increased.

4. The turbine engine of claim 1 wherein the compressor includes a plurality of stages of compressor blades and a plurality of stages of compressor vanes within the compressor case, wherein the inlet is located between one of the stages of compressor blades and one of the stages of compressor vanes.

5. The turbine engine of claim 1 wherein the bleed valve is radially outward of the compressor case.

6. The turbine engine of claim 1 further including an actuation valve selectively supplying high pressure core airflow into the inflatable valve from an area after the compressor chamber to selectively open and close the inflatable valve.

7. The compressor of claim 6, wherein the area is the combustor.

8. The turbine engine of claim 1 wherein the bleed valve is radially inward of a bypass airflow path through the turbine engine.

9. The compressor of claim 1, wherein a conduit from a combustor supplies pressurized air to the bleed valve.

10. The compressor of claim 1, wherein the passageway extends in an axially forwards direction.

11. The compressor of claim 1, wherein the passageway includes an outlet substantially radially aligned with the inlet.

12. The compressor of claim 1, wherein the passageway is in direct fluid communication with the inlet.

13. The compressor of claim 1, wherein the bleed valve is at least partially radially inward of a splitter, wherein the splitter is radially outward of the compressor case.

14. The compressor of claim 13, wherein air flowing through the bleed valve is released into the passageway between the compressor case and the splitter.

15. A bleed valve for a compressor for a turbine engine comprising:
a first member at least partially defining a passageway from an inlet in direct fluid communication with the compressor; and
an annular valve member adjacent a portion of the passageway, wherein the valve member is selectively moved into the passageway to selectively obstruct the passageway upon the introduction of a pressurized fluid to the bleed valve.

16. The bleed valve of claim 15 wherein the first member is an annular first member and wherein the valve member is an expandable member, the first member and the expandable member defining an inflatable interior therebetween.

17. The bleed valve of claim 16 wherein the valve member selectively obstructs the passageway in a continuously variable manner between a fully open position and a fully closed position.

18. The bleed valve of claim 15 wherein the valve member increases its obstruction of the passageway as the pressure of the pressurized fluid is increased.

19. A compressor for a turbine engine including the bleed valve of claim 15, wherein the compressor includes a plurality of stages of compressor blades and a plurality of stages of compressor vanes, wherein the inlet of the bleed valve is located between one of the stages of compressor blades and one of the stages of compressor vanes.

20. The compressor of claim 19 wherein the bleed valve is radially outward of the compressor blades and the compressor vanes.

21. The compressor of claim 19 wherein the valve member is an expandable member and where the expandable member is inflated by the pressurized fluid to selectively obstruct the passageway.

22. A method for controlling bleed air from a compressor of a turbine engine including the steps of:
a) supplying a fluid from an area after a centrifugal compressor chamber in a fan blade to an inflatable member adjacent an inlet of a bleed air passageway that leads from an interior of the compressor; and
b) controlling a pressure of the fluid within the inflatable member, using an actuation valve, to selectively contract and expand the inflatable member to selectively obstruct bleed air through the passageway.

23. The method of claim 22 further including the step of selectively expanding the inflatable member into the passageway to obstruct bleed air through the passageway.

24. The method of claim 22 further including the step of varying the pressure within the inflatable member such that the inflatable member is continuously adjustable between a fully contracted position in which the passageway is completely unobstructed by the inflatable member and a fully expanded position in which the passageway is completely obstructed by the inflatable member.

25. The method of claim 22 wherein said step b) further includes the step of increasing the pressure within the inflatable member to increase obstruction of the bleed air through the passageway.

26. The method of claim 22 wherein at least a portion of the inflatable member is radially inward of a bypass air flow path of the turbine engine.

27. The method of claim 22 further including the step of: selectively obstructing the passageway in a continuously variable manner between a fully open position and a fully closed position.

* * * * *